United States Patent
Kubo et al.

(10) Patent No.: US 6,748,152 B2
(45) Date of Patent: Jun. 8, 2004

(54) OPTICAL TRANSMISSION SYSTEM

(75) Inventors: Yuji Kubo, Yokohama (JP); Masashi Onishi, Yokohama (JP); Takatoshi Kato, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/098,172

(22) Filed: Mar. 15, 2002

(65) Prior Publication Data

US 2003/0174980 A1 Sep. 18, 2003

(51) Int. Cl.$^7$ .............................. G02B 6/02; H04B 10/12
(52) U.S. Cl. .................... 385/126; 359/334; 359/337.5; 359/341.1; 359/341.2; 359/341.3
(58) Field of Search ................................ 385/123–128; 359/337–339, 341.1, 341.2, 341.3, 334

(56) References Cited

U.S. PATENT DOCUMENTS

| | | | |
|---|---|---|---|
| 6,266,467 B1 | 7/2001 | Kato et al. | |
| 6,437,906 B1 * | 8/2002 | Di Pasquale et al. | 359/337.2 |
| 6,574,037 B2 * | 6/2003 | Islam et al. | 359/334 |
| 6,577,800 B2 * | 6/2003 | Sarchi et al. | 385/123 |

* cited by examiner

Primary Examiner—Akm Enayet Ullah
Assistant Examiner—Jerry T Rahll
(74) Attorney, Agent, or Firm—McDermott, Will & Emery (57) ABSTRACT

The optical transmission system in accordance with the present invention is an optical transmission system in which an optical fiber transmission line is laid between a transmitting station and a receiving station, first and second optical couplers are provided on the optical fiber transmission line, a first Raman amplification pumping light source is connected to the first optical coupler, a second Raman amplification pumping light source is connected to the second optical coupler, the optical fiber transmission line Raman-amplifies signal light in S band when Raman amplification pumping light is supplied thereto while transmitting the signal light, and the optical fiber transmission line has a zero-dispersion wavelength of 1350 nm to 1440 nm and a cable cutoff wavelength of less than 1368 nm.

7 Claims, 5 Drawing Sheets

OPTICAL TRANSMISSION SYSTEM

BACKGROUND OF THE INVENTION

1. Field of the Invention

The present invention relates to an optical transmission system which transmits a plurality of wavelengths of signal light in a wavelength division multiplexing manner.

2. Related Background Art

Silica type optical fibers are used as optical transmission lines in optical transmission systems. Chromatic dispersion becomes zero in the vicinity of a wavelength of 1.3 μm in typical single-mode optical fibers which are most commonly in use among the silica type optical fibers. Hence, signal light in the 1.3-μm wavelength band is used since the waveform of signal light can be restrained from deteriorating due to cumulative chromatic dispersion.

Since the transmission loss of silica type optical fibers becomes the lowest in the vicinity of a wavelength of 1.55 μm, whereas optical fiber amplifiers which can optically amplify signal light in C band (a wavelength band from 1530 nm to 1565 nm) and L band (a wavelength band from 1565 nm to 1625 nm) have come into practical use, the signal light in C and L bands is also in use. In this case, in order to restrain the waveform of signal light from deteriorating due to cumulative chromatic dispersion in these wavelength bands, dispersion-shifted optical fibers whose chromatic dispersion becomes zero in the vicinity of a wavelength of 1.55 μm are favorably used.

Meanwhile, a wavelength division multiplexing (WDM) optical transmission system transmits a plurality of wavelengths of signal light in a wavelength division multiplexing manner, thereby being able to perform communications with a large capacity at a high speed. A larger capacity is demanded therefor, whereas its signal light wavelength band is desired to be expanded. However, the above-mentioned typical single-mode optical fibers may not be suitable for transmitting signal light in the 1.55-μm wavelength band, since their chromatic dispersion has a large absolute value in the 1.55-μm wavelength band. Also, the above-mentioned dispersion-shifted optical fibers may not be suitable for transmitting signal light in the 1.3-μm wavelength band, since their chromatic dispersion has a large absolute value in the 1.3-μm wavelength band.

Therefore, an optical fiber intended for propagating both signal light in the 1.3-μm wavelength band and signal light in the 1.55-μm wavelength band has been proposed (see Japanese Patent Application Laid-Open No. HEI 11-281840). This optical fiber has a zero-dispersion wavelength in the vicinity of the absorption peak caused by OH group, whereas the absolute value of chromatic dispersion is relatively small in each of the 1.3-μm wavelength band and 1.55-μm wavelength band.

Though the optical fiber proposed in the above-mentioned publication is intended for propagating signal light in the 1.3-μm wavelength band in addition to that in the 1.55-μm wavelength band, transmission loss is greater in the 1.3-μm wavelength band than in the 1.55-μm wavelength band. However, no optical amplifier has been known to be favorable and practical as one which can optically amplify signal light in the 1.3-μm wavelength band. Therefore, optical transmission systems using the optical fiber proposed in the above-mentioned publication as an optical transmission line may not be suitable for performing long-distance communications.

SUMMARY OF THE INVENTION

In order to overcome the problem mentioned above, it is an object of the present invention to provide an optical transmission system which can perform optical transmissions over a long distance at a low loss by using a plurality of wavelengths of signal light in a wide signal light wavelength band.

The optical transmission system in accordance with the present invention comprises an optical fiber transmission line having a zero-dispersion wavelength of 1350 nm to 1440 nm and a cable cutoff wavelength band of less than 1368 nm, the optical fiber transmission line transmitting signal light at least in a wavelength band from 1450 nm to 1530 nm (S band) and Raman-amplifying the signal light in S band when Raman amplification pumping light is supplied thereto; and Raman amplification pumping light supplying means for supplying the Raman amplification pumping light to the optical fiber transmission line.

According to this optical transmission system, Raman amplification pumping light supplying means supplies Raman amplification pumping light to an optical fiber transmission line. Signal light in S band (a wavelength band from 1450 nm to 1530 nm) is transmitted through the optical fiber transmission line and is Raman-amplified during the transmission. In this optical transmission system, since the cable cutoff wavelength of the optical fiber transmission line is less than 1368 nm, each of the signal light in S band and the Raman amplification pumping light (having a wavelength of 1368 nm to 1439 nm) can propagate through the optical fiber transmission line. Since the zero-dispersion wavelength of the optical fiber transmission line is 1350 nm to 1440 nm, the chromatic dispersion of the optical fiber transmission line in S band becomes at least 0.1 ps/nm/km, so that four-wave mixing is restrained from occurring, whereby this optical transmission system is suitable for propagating a plurality of wavelengths of signal light in S band.

Therefore, in the optical transmission system, a plurality of wavelengths of signal light in S band are Raman-amplified when propagating through the optical fiber transmission line, so that their effective loss is small, whereby repeating sections can be made longer. Since the waveform of signal light is restrained from deteriorating due to four-wave mixing, the power of signal light can be made higher, which also allows repeating sections to become longer.

In the optical transmission system in accordance with the present invention, the optical fiber transmission line may have an effective core area of at least 45 μm$^2$ at a wavelength of 1550 nm. In this case, nonlinear optical phenomena including four-wave mixing are restrained from occurring, so that the deterioration in waveform of signal light is further suppressed, whereby the power of signal light can further be enhanced. Therefore, repeating sections can further be made longer.

In the optical transmission system in accordance with the present invention, the optical fiber transmission line may have a chromatic dispersion slope with an absolute value of 0.065 ps/nm$^2$/km or less at a wavelength of 1550 nm. In this case, the cumulative chromatic dispersion of signal light generated upon the propagation through the optical fiber transmission line can be compensated for by a dispersion compensator provided in a receiving station, for example.

In the optical transmission system in accordance with the present invention, the optical fiber transmission line may have a transmission loss of 0.5 dB/km or less at a wavelength of 1380 nm. In this case, loss is small in the vicinity of a wavelength of 1380 nm at which an absorption peak is caused by OH group, so that the Raman amplification pumping light near this wavelength can propagate through the optical fiber transmission line at a low loss, whereby Raman amplification gain can fully be secured. Therefore, repeating sections can further be made longer.

In the optical transmission system in accordance with the present invention, the optical fiber transmission line may also transmit signal light in a wavelength band from 1530 nm to 1565 nm (C band) or signal light in a wavelength band from 1565 nm to 1625 nm (L band), whereas an Er-doped optical fiber amplifier for optically amplifying signal light in C band or L band when pumping light is supplied thereto may further be provided. In this case, signal light in S band is Raman-amplified in the optical fiber transmission line, while signal light in C or L band is optically amplified by the Er-doped optical fiber amplifier. Therefore, this optical transmission system can perform optical transmissions over a long distance at a low loss by using a plurality of wavelengths of signal light in a wide signal light wavelength band including S, C, and L bands.

In the optical transmission system in accordance with the present invention, the pumping light supplied to the Er-doped optical fiber amplifier may have a wavelength of 980 nm. This case is suitable for transmitting signal light in S band by using pumping light having a wavelength shorter than S band.

In the optical transmission system in accordance with the present invention, the Raman amplification pumping light supplying means may propagate the Raman amplification pumping light from an introducing position for the Raman amplification pumping light into the optical fiber transmission line in a direction opposite from that directed to an Er-doped optical fiber amplifier whose distance from the introducing position along the optical fiber transmission line is the shortest. Since the Raman amplification pumping light can be propagated over a long distance, this case is suitable for Raman-amplifying signal light in S band.

DETAILED DESCRIPTION OF THE PREFERRED EMBODIMENTS

In the following, embodiments of the present invention will be explained in detail with reference to the accompanying drawings. In the explanation of the drawings, constituents identical to each other will be referred to with numerals identical to each other without repeating their overlapping descriptions.

First Embodiment

Figure 1:
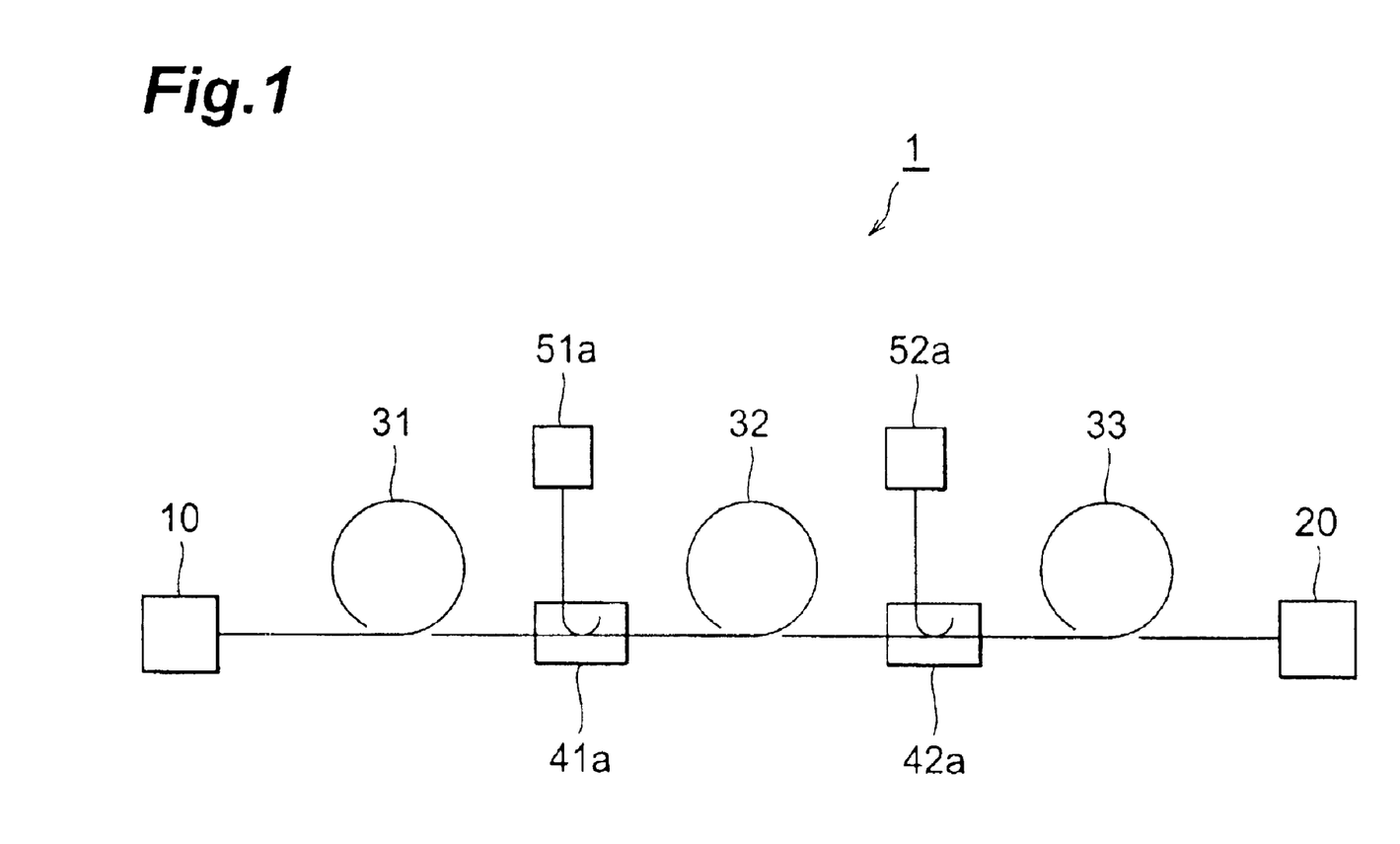
FIG. 1 is a schematic diagram of the optical transmission system in accordance with a first embodiment.

To begin with, a first embodiment of the optical transmission system in accordance with the present invention will be explained. FIG. 1 is a schematic diagram of the optical transmission system 1 in accordance with the first embodiment. This optical transmission system 1 comprises a transmitting station 10, a receiving station 20, and optical fiber transmission lines 31 to 33 laid therebetween. Disposed on the optical fiber transmission lines 31 to 33 are optical couplers 41a and 42a, to which Raman amplification pumping light sources 51a and 52a are connected, respectively.

The transmitting station 10 multiplexes a plurality of wavelengths of signal light at least in S band (a wavelength band from 1450 nm to 1530 nm), and sends out thus multiplexed signal light to the optical fiber transmission line 31. To the receiving station 20, each of the optical fiber transmission lines 31 to 33 transmits the signal light sent out from the transmitting station 10. The receiving station 20 demultiplexes the plurality of wavelengths of signal light fed therein by way of the optical fiber transmission line 33, and receives each wavelength of signal light.

The optical coupler 41a and Raman amplification pumping light source 51a act as Raman amplification pumping light supplying means for supplying Raman amplification pumping light (having a wavelength of 1368 nm to 1439 nm) to the optical fiber transmission line 32. Namely, the Raman amplification pumping light source 51a outputs Raman amplification pumping light, whereas the optical coupler 41a supplies the Raman amplification pumping light to the optical fiber transmission line 32. Similarly, the optical coupler 42a and Raman amplification pumping light source 52a act as Raman amplification pumping light supplying means for supplying Raman amplification pumping light to the optical fiber transmission line 33. Namely, the Raman amplification pumping light source 52a outputs Raman amplification pumping light, whereas the optical coupler 42a supplies the Raman amplification pumping light to the optical fiber transmission line 33.

While transmitting signal light, each of the optical fiber transmission lines 31 to 33 Raman-amplifies the signal light when the Raman amplification pumping light is supplied thereto. Each of the optical fiber transmission lines 31 to 33 has a zero-dispersion wavelength of 1350 nm to 1440 nm, whereas its cable cutoff wavelength defined by G.650 of ITU-T is less than 1368 nm. Also, for example, each of the optical fiber transmission lines 31 to 33 has a transmission loss of 0.20 dB/km and a chromatic dispersion of 7.9 ps/nm/km at a wavelength of 1550 nm, a zero-dispersion wavelength of 1410 nm, and a cutoff wavelength of 1350 nm.

In thus configured optical transmission system 1, the Raman amplification pumping light outputted from the Raman amplification pumping light source 51a is supplied to the optical fiber transmission line 32 by way of the optical coupler 41a, whereas the Raman amplification pumping light outputted from the Raman amplification pumping light source 52a is supplied to the optical fiber transmission line 33 by way of the optical coupler 42a. A plurality of wavelengths of signal light in S band sent out from the transmitting station 10 after wavelength division multiplexing are successively transmitted through the optical fiber transmission lines 31 to 33 while being Raman-amplified, so as to reach the receiving station 20. The plurality of wavelengths of signal light having reached the receiving station 20 are demultiplexed in the receiving station 20, whereby each wavelength of signal light is received.

In the optical transmission system 1, since each of the optical fiber transmission lines 31 to 33 has a cable cutoff wavelength of less than 1368 nm, each of the signal light (in S band (a wavelength band from 1450 nm to 1530 nm) and the Raman amplification pumping light (having a wavelength of 1368 nm to 1439 nm) can propagate through the optical fiber transmission lines 31 to 33. Also, since each of the optical fiber transmission lines 31 to 33 has a zero-dispersion wavelength of 1350 nm to 1440 nm, the chromatic dispersion of each of the optical fiber transmission lines 31 to 33 in S band becomes at least 0.1 ps/nm/km, so that the occurrence of four-wave mixing is suppressed, whereby the optical transmission system 1 is suitable for propagating a plurality of wavelengths of signal light in S band. Further, since the wavelength of Raman amplification pumping light is 1368 nm to 1439 nm, which is shorter than S band by 13.2 THz, signal light in S band (a wavelength band from 1450 nm to 1530 nm) can be Raman-amplified.

Therefore, a plurality of wavelengths of signal light sent out from the transmitting station 10 are Raman-amplified when propagating through the optical fiber transmission lines 31 to 33 in the optical transmission system 1, so that their effective loss is small, whereby repeating sections can be made longer. Also, the waveform of signal light is restrained from deteriorating due to four-wave mixing, so that the power of signal light can be made greater, which also allows repeating sections to become longer.

Preferably, each of the optical fiber transmission lines 31 to 33 has an effective core area of at least 45 $\mu m^2$ at a wavelength of 1550 nm. This suppresses the occurrence of nonlinear optical phenomena including four-wave mixing, thereby further suppressing the waveform of signal light from deteriorating, which allows the power of signal light to be further enhanced. Therefore, repeating sections can further be made longer.

Preferably, each of the optical fiber transmission lines 31 to 33 has a chromatic dispersion slope with an absolute value of 0.065 ps/nm$^2$/km or less. This allows the cumulative chromatic dispersion of signal light generated upon the propagation through the optical fiber transmission lines 31 to 33 to be compensated for by a dispersion compensator provided in the receiving station 20.

Preferably, each of the optical fiber transmission lines 31 to 33 has a transmission loss of 0.5 dB/km or less at a wavelength of 1380 nm. In this case, loss is small in the vicinity of a wavelength of 1380 nm at which an absorption peak is caused by OH group, so that the Raman amplification pumping light near this wavelength can propagate through each of the optical fiber transmission lines 31 to 33 at a low loss, where by Raman amplification gain is fully secured. Therefore, repeating sections can further be made longer.

Second Embodiment

Figure 2:
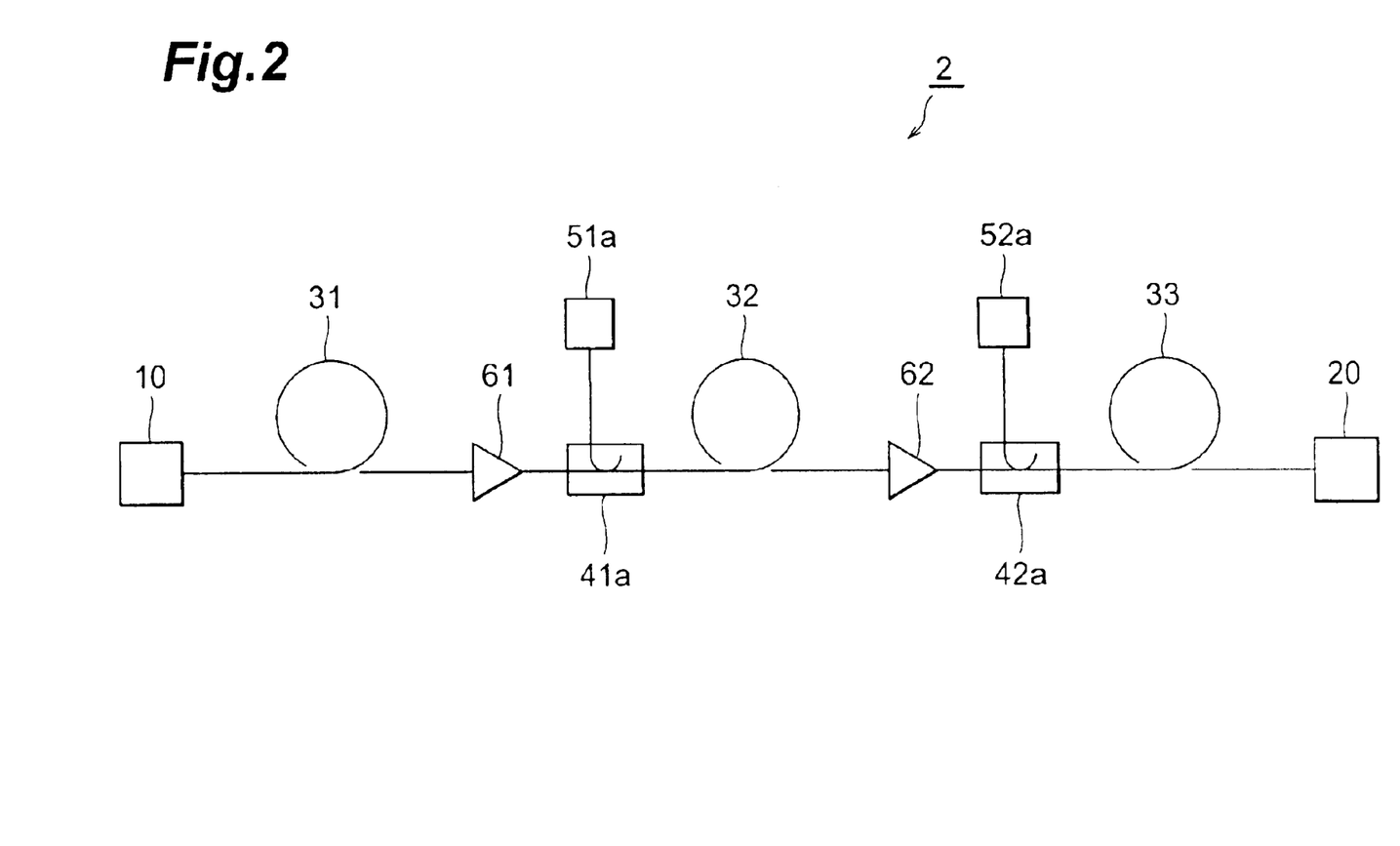
FIG. 2 is a schematic diagram of the optical transmission system in accordance with a second embodiment.

A second embodiment of the optical transmission system in accordance with the present invention will now be explained. FIG. 2 is a schematic diagram of the optical transmission system 2 in accordance with the second embodiment. The optical transmission system 2 in accordance with the second embodiment is one in which Er-doped optical fiber amplifiers 61, 62 are added to the optical transmission system 1 in accordance with the first embodiment.

Each of the Er-doped optical fiber amplifiers 61, 62 uses as an optical amplifier medium an Er-doped optical fiber whose optical waveguide region is doped with Er element, and pumps Er element by inputting pumping light into the Er-doped optical fiber, thereby optically amplifying signal light propagating through the Er-doped optical fiber. Wavelengths of signal light which can optically be amplified by each of the Er-doped optical fiber amplifiers 61, 62 are in C band (a wavelength band from 1530 nm to 1565 nm) and L band (a wavelength band from 1565 nm to 1625 nm). The wavelength of pumping light is 980 nm or 1480 nm in general. Since signal light in S band (a wavelength band from 1450 nm to 1530 nm) is also propagated in this embodiment, each of the Er-doped optical fiber amplifiers 61, 62 uses pumping light having a wavelength of 980 nm without using pumping light having a wavelength of 1480 nm within the S band.

The optical coupler 41a, Raman amplification pumping light source 51a, and Er-doped optical fiber amplifier 61 are provided in one repeater. The optical coupler 41a is disposed downstream the Er-doped optical fiber amplifier 61. The Raman amplification pumping light supplied from the optical coupler 41a propagates through the optical fiber transmission line 32 in the direction (i.e., downstream direction) opposite from that directed to the Er-doped optical fiber amplifier 61 whose distance from the introducing position (i.e., the position at which the optical coupler 41a is provided) along the optical fiber transmission line is the shortest. This allows the Raman amplification pumping light to propagate over a long distance, which is suitable for Raman-amplifying signal light in S band.

Similarly, the optical coupler 42a, Raman amplification pumping light source 52a, and Er-doped optical fiber amplifier 62 are provided in one repeater. The optical coupler 42a is disposed downstream the Er-doped optical fiber amplifier 62. The Raman amplification pumping light supplied from the optical coupler 42a propagates through the optical fiber transmission line 33 in the direction (i.e., downstream direction) opposite from that directed to the Er-doped optical fiber amplifier 62 whose distance from the introducing position (i.e., the position at which the optical coupler 42a is provided) along the optical fiber transmission line is the shortest. This allows the Raman amplification pumping light to propagate over a long distance, which is suitable for Raman-amplifying signal light in S band.

In thus configured optical transmission system 2, the Raman amplification pumping light outputted from the Raman amplification pumping light source 51a is supplied to the optical fiber transmission line 32 by way of the optical coupler 41a, whereas the Raman amplification pumping light outputted from the Raman amplification pumping light source 52a is supplied to the optical fiber transmission line 33 by way of the optical coupler 42a. A plurality of wavelengths of signal light in S, C, or L band sent out from the transmitting station 10 after wavelength division multiplexing are successively transmitted through the optical fiber transmission lines 31 to 33, so as to reach the receiving station 20. Upon this transmission, the signal light in S band is Raman-amplified. The signal light in C or L band is optically amplified by each of the Er-doped optical fiber amplifiers 61, 62. A plurality of wavelengths of signal light having reached the receiving station 20 are demultiplexed by the receiving station 20, whereby each wavelength of signal light is received.

In the optical transmission system 2, since each of the optical fiber transmission lines 31 to 33 has a cable cutoff wavelength of less than 1368 nm, each of the signal light (in S, C, or L band) and Raman amplification pumping light (having a wavelength of 1368 nm to 1439 nm) can propagate through the optical fiber transmission lines 31 to 33. In this optical transmission system 2, since the zero-dispersion wavelength of each of the optical fiber transmission lines 31 to 33 is 1350 nm to 1440 nm, the chromatic dispersion of each of the optical fiber transmission lines 31 to 33 in S, C, and L bands becomes at least 0.1 ps/nm/km, so that the occurrence of four-wave mixing is suppressed, which is suitable for propagating a plurality of wavelengths of signal light in S, C, or L band.

When the Raman amplification pumping light has a wavelength of 1368 nm to 1439 nm, which is shorter than S band by 13.2 THz, signal light in S band (a wavelength band from 1450 nm to 1530 nm) can be Raman-amplified. On the other hand, signal light in C or L band is optically amplified by each of the Er-doped optical fiber amplifiers 61, 62.

In the optical transmission system 2, a plurality of wavelengths of signal light in S, C, or L band sent out from the transmitting station 10 are Raman-amplified or optically amplified by the Er-doped optical fiber amplifiers 61, 62 when propagating through the optical fiber transmission lines 31 to 33, so that their effective loss is small, whereby repeating sections can be made longer. Also, the waveform of signal light is restrained from deteriorating due to four-wave mixing, so that the power of signal light can be enhanced, which also allows repeating sections to become longer. Namely, the optical transmission system 2 can perform optical transmissions over a long distance at a low loss by using a plurality of wavelengths of signal light in a wide signal light wavelength band including S, C, and L bands.

Third Embodiment

Figure 3:
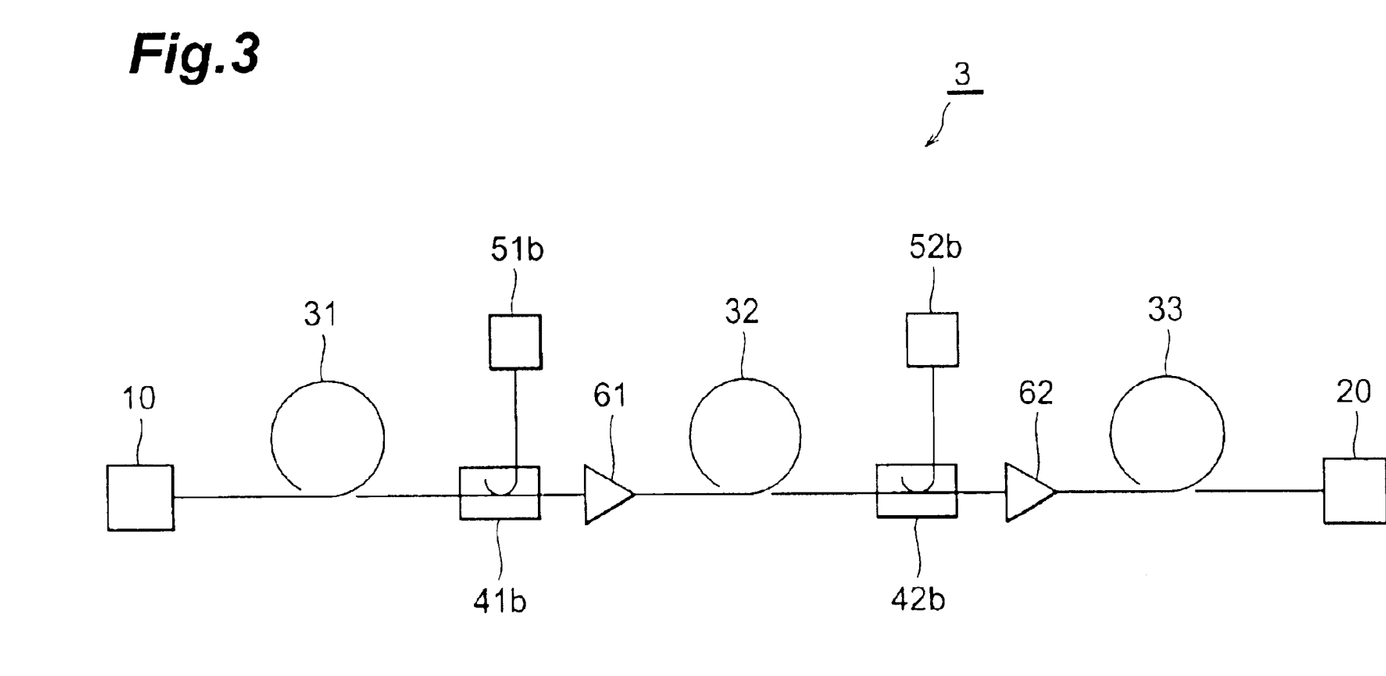
FIG. 3 is a schematic diagram of the optical transmission system in accordance with a third embodiment.

A third embodiment of the optical transmission system in accordance with the present invention will now be explained. FIG. 3 is a schematic diagram of the optical transmission system 3 in accordance with the third embodiment. The optical transmission system 3 in accordance with the third embodiment differs from the optical transmission system 2 in accordance with the second embodiment in that an optical coupler 41b is provided upstream the Er-doped optical fiber amplifier 61 in place of the optical coupler 41a on the downstream thereof, and that an optical coupler 42b is provided upstream the Er-doped optical fiber amplifier 62 in place of the optical coupler 42a on the downstream thereof.

The optical coupler 41b, a Raman amplification pumping light source 51b, and the Er-doped optical fiber amplifier 61 are provided in one repeater. The optical coupler 41b is disposed upstream the Er-doped optical fiber amplifier 61. The Raman amplification pumping light supplied from the optical coupler 41b propagates through the optical fiber transmission line 31 in the direction (i.e., upstream direction) opposite from that directed to the Er-doped optical fiber amplifier 61 whose distance from the introducing position (i.e., the position at which the optical coupler 41b is provided) along the optical fiber transmission line is the shortest. This allows the Raman amplification pumping light to propagate over a long distance, which is suitable for Raman-amplifying signal light in S band.

Similarly, the optical coupler 42b, a Raman amplification pumping light source 52b, and the Er-doped optical fiber amplifier 62 are provided in one repeater. The optical coupler 42b is disposed upstream the Er-doped optical fiber amplifier 62. The Raman amplification pumping light supplied from the optical coupler 42b propagates through the optical fiber transmission line 32 in the direction (i.e., upstream direction) opposite from that directed to the Er-doped optical fiber amplifier 62 whose distance from the introducing position (i.e., the position at which the optical coupler 42b is provided) along the optical fiber transmission line is the shortest. This allows the Raman amplification pumping light to propagate over a long distance, which is suitable for Raman-amplifying signal light in S band.

Thus configured optical transmission system 3 operates in substantially the same manner as in the second embodiment, and exhibits effects similar thereto.

Fourth Embodiment

Figure 4:
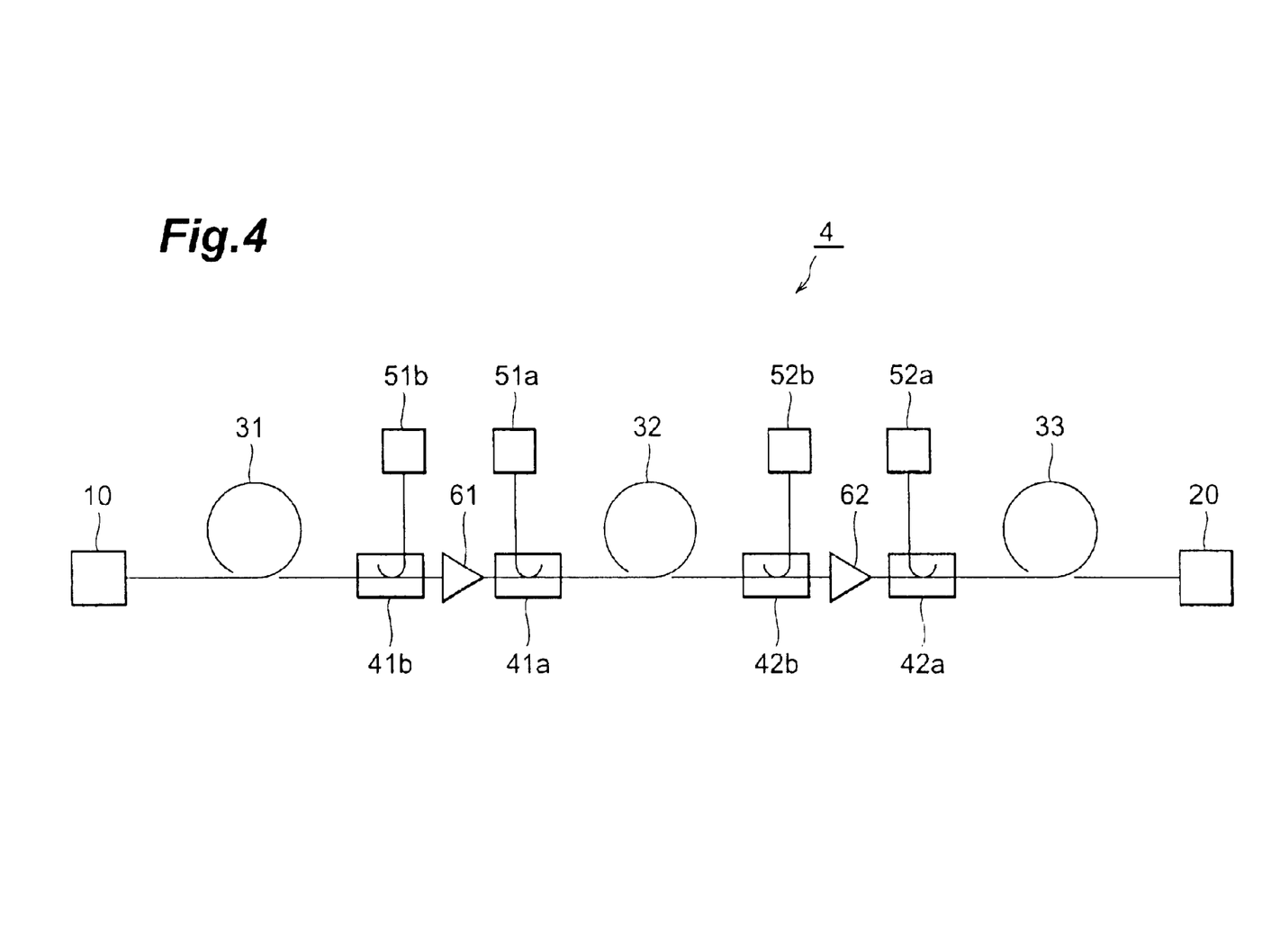
FIG. 4 is a schematic diagram of the optical transmission system in accordance with a fourth embodiment.

A fourth embodiment of the optical transmission system in accordance with the present invention will now be explained. FIG. 4 is a schematic diagram of the optical transmission system 4 in accordance with the fourth embodiment. The optical transmission system 4 in accordance with the fourth embodiment comprises, in addition to the optical transmission system 2 in accordance with the second embodiment, an optical coupler 41b and a Raman amplification pumping light source 51b which are provided upstream the Er-doped optical fiber amplifier 61, and an optical coupler 42b and a Raman amplification pumping light source 52b which are provided upstream the Er-doped optical fiber amplifier 62.

The optical couplers 41a, 41b, Raman amplification pumping light sources 51a, 51b, and Er-doped optical fiber amplifier 61 are provided in one repeater. The optical coupler 41a is disposed downstream the Er-doped optical fiber amplifier 61, whereas the Raman amplification pumping light supplied from the optical coupler 41a propagates through the optical fiber transmission line 32 in the direction (i.e., downstream direction) opposite from that directed to the Er-doped optical fiber amplifier 61 whose distance from the introducing position (i.e., the position at which the optical coupler 41a is provided) along the optical fiber transmission line is the shortest. The optical coupler 41b is disposed upstream the Er-doped optical fiber amplifier 61, whereas the Raman amplification pumping light supplied from the optical coupler 41b propagates through the optical fiber transmission line 31 in the direction (i.e., upstream direction) opposite from that directed to the Er-doped optical fiber amplifier 61 whose distance from the introducing position (i.e., the position at which the optical coupler 41b is provided) along the optical fiber transmission line is the shortest. This allows the Raman amplification pumping light to propagate over a long distance, which is suitable for Raman-amplifying signal light in S band.

Similarly, the optical couplers 42a, 42b, Raman amplification pumping light sources 52a, 52b, and Er-doped optical fiber amplifier 62 are provided in one repeater. The optical coupler 42a is disposed downstream the Er-doped optical fiber amplifier 62, whereas the Raman amplification pumping light supplied from the optical coupler 42a propagates through the optical fiber transmission line 33 in the direction (i.e., downstream direction) opposite from that directed to the Er-doped optical fiber amplifier 62 whose distance from the introducing position (i.e., the position at which the optical coupler 42a is provided) along the optical fiber transmission line is the shortest. The optical coupler 42b is disposed upstream the Er-doped optical fiber amplifier 62, whereas the Raman amplification pumping light supplied from the optical coupler 42b propagates through the optical fiber transmission line 32 in the direction (i.e., upstream direction) opposite from that directed to the Er-doped optical fiber amplifier 62 whose distance from the introducing position (i.e., the position at which the optical coupler 42b is provided) along the optical fiber transmission line is the shortest. This allows the Raman amplification pumping light to propagate over a long distance, which is suitable for Raman-amplifying signal light in S band.

Thus configured optical transmission system 4 operates in substantially the same manner as in the second or third embodiment, and exhibits effects similar thereto. In particular, since Raman amplification pumping light is bidirectionally supplied to the optical fiber transmission lines, signal light in S band can be Raman-amplified with a high efficiency in this embodiment.

Fifth Embodiment

Figure 5:
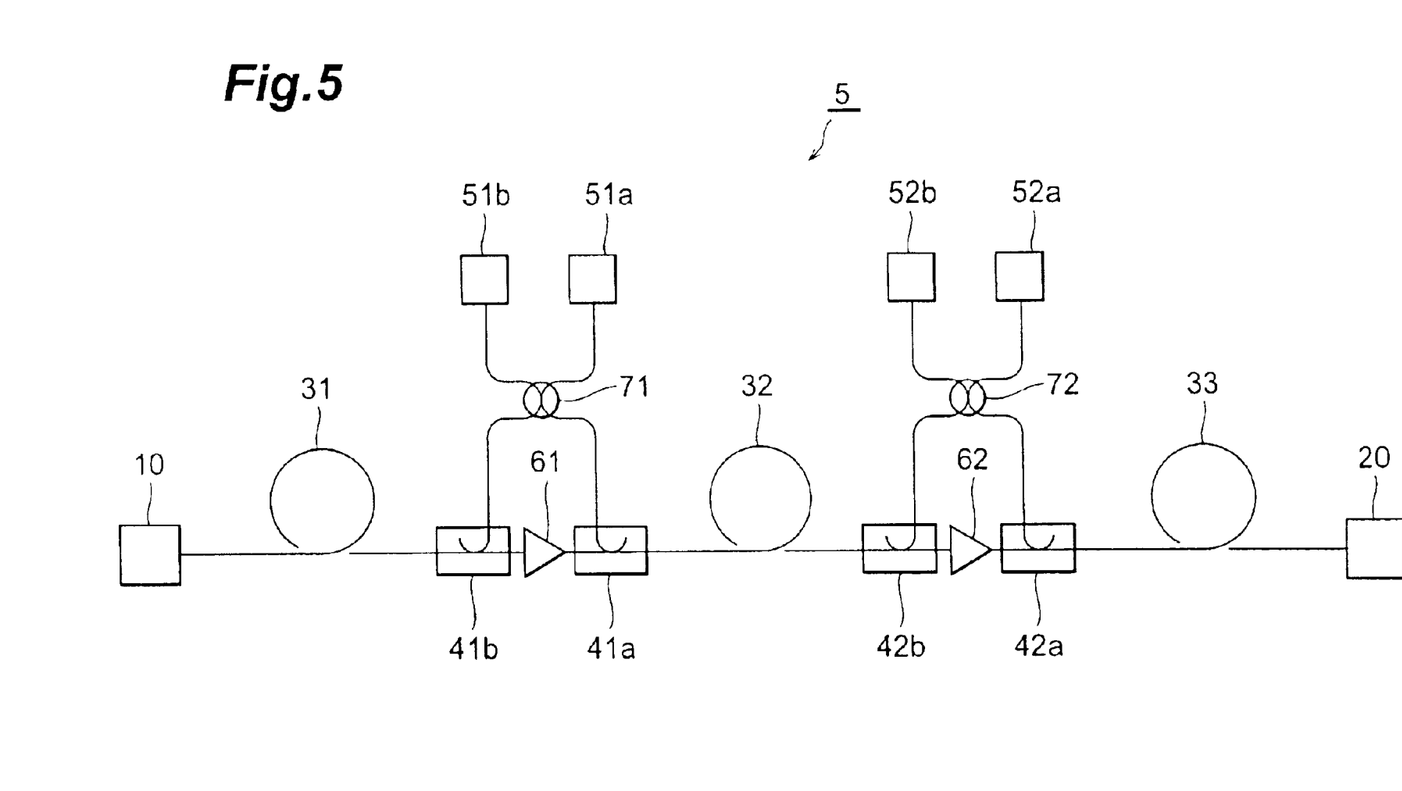
FIG. 5 is a schematic diagram of the optical transmission system in accordance with a fifth embodiment.

A fifth embodiment of the optical transmission system in accordance with the present invention will now be explained. FIG. 5 is a schematic diagram of the optical transmission system 5 in accordance with the fifth embodiment. The optical transmission system 5 in accordance with the fifth embodiment is one comprising optical couplers 71, 72 in addition to the optical transmission system 4 in accordance with the fourth embodiment.

The optical coupler 71 splits Raman amplification pumping light outputted from a Raman amplification pumping light source 51a into two, and outputs them to optical couplers 41a and 41b, respectively. At the same time, the optical coupler 71 splits Raman amplification pumping light outputted from a Raman amplification pumping light source 51b into two, and outputs them to the optical couplers 41a and 41b, respectively.

Similarly, the optical coupler 72 splits Raman amplification pumping light outputted from a Raman amplification pumping light source 52a into two, and outputs them to optical couplers 42a and 42b, respectively. At the same time, the optical coupler 72 splits Raman amplification pumping light outputted from a Raman amplification pumping light source 52b into two, and outputs them to the optical couplers 42a and 42b, respectively.

Thus configured optical transmission system 5 operates in substantially the same manner as in the fourth embodiment, and exhibits substantially the same effects. In particular, since the Raman amplification pumping light outputted from each of the Raman amplification pumping light sources 51a and 51b is split into two so as to be supplied to optical fiber transmission lines by way of the optical couplers 41a and 41b, respectively, the Raman amplification pumping light sources 51a and 51b can back up each other. Similarly, since the Raman amplification pumping light outputted from each of the Raman amplification pumping light sources 52a and 52b is split into two so as to be supplied to optical fiber transmission lines by way of the optical couplers 42a and 42b, respectively, the Raman amplification pumping light sources 52a and 52b can back up each other.

According to the present invention, as explained in detail in the foregoing, Raman amplification pumping light supplying means supplies Raman amplification pumping light to an optical fiber transmission line. Signal light in S band (a wavelength band from 1450 nm to 1530 nm) is transmitted through the optical fiber transmission line while being Raman-amplified during the transmission. Since the cable cutoff wavelength of optical fiber transmission line is less than 1368 nm, each of the signal light in S band and Raman amplification pumping light (having a wavelength of 1368 nm to 1439 nm) can propagate through the optical fiber transmission line in this optical transmission system. Also, since the zero-dispersion wavelength of optical fiber transmission line is 1350 nm to 1440 nm in this optical transmission system, the chromatic dispersion of optical fiber transmission line in S band be comes at least 0.1 ps/nm/km, whereby four-wave mixing is restrained from occurring, which is suitable for propagating a plurality of wavelengths of signal light in S band.

Therefore, in the optical transmission system, a plurality of wavelengths of signal light in S band are Raman-amplified when propagating through the optical fiber transmission line, so that their effective loss is small, whereby repeating sections can be made longer. Since the waveform of signal light is restrained from deteriorating due to four-wave mixing, the power of signal light can be made higher, which also allows repeating sections to become longer.

When the optical fiber transmission line has an effective core area of at least 45 $\mu m^2$ at a wavelength of 1550 nm, nonlinear optical phenomena including four-wave mixing are restrained from occurring, so that the signal light is further restrained from deteriorating, whereby the power of signal light can further be enhanced. Therefore, repeating sections can further be made longer.

When the optical fiber transmission line has achromatic dispersion slope with an absolute value of 0.065 $ps/nm^2/km$ or less at a wavelength of 1550 nm, the cumulative chromatic dispersion of signal light generated upon the propagation through the optical fiber transmission line can be compensated for by a dispersion compensator provided in a receiving station, for example.

When the optical fiber transmission line has a transmission loss of 0.5 dB/km or less at a wavelength of 1380 nm, loss is small in the vicinity of a wavelength of 1380 nm at which an absorption peak is caused by OH group, so that the Raman amplification pumping light near this wavelength can propagate through the optical fiber transmission line at a low loss, whereby Raman amplification gain can fully be secured. Therefore, repeating sections can further be made longer.

In the case where the optical fiber transmission line also transmits signal light in C or L band, whereas an Er-doped optical fiber amplifier which optically amplifies signal light in C or L band when pumping light is supplied thereto is further provided, signal light in S band is Raman-amplified in the optical fiber transmission line while signal light in C or L band is optically amplified by the Er-doped optical fiber amplifier. Therefore, this optical transmission system can perform optical transmissions over a long distance at a low loss by using a plurality of wavelengths of signal light in a wide signal light wavelength band including S, C, and L bands.

When the pumping light supplied to the Er-doped optical fiber amplifier has a wavelength of 980 nm, it is suitable for transmitting signal light in S band by using pumping light having a wavelength shorter than S band.

Preferably, the Raman amplification pumping light supplying means propagates the Raman amplification pumping light from an introducing position for the Raman amplification pumping light into the optical fiber transmission line in a direction opposite from that directed to an Er-doped optical fiber amplifier whose distance from the introducing position along the optical fiber transmission line is the shortest. Since the Raman amplification pumping light can be propagated over a long distance, this case is suitable for Raman-amplifying signal light in S band.

What is claimed is:

1. An optical transmission system comprising:
    an optical fiber transmission line having a zero-dispersion wavelength of 1350 nm to 1440 nm and a cable cutoff wavelength band of less than 1368 nm, said optical fiber transmission line transmitting signal light at least in a wavelength band from 1450 nm to 1530 nm (S band) and Raman-amplifying said signal light in S band when Raman amplification pumping light is supplied thereto; and
    Raman amplification pumping light supplying means for supplying said Raman amplification pumping light to said optical fiber transmission line,
    wherein said optical fiber transmission line has a transmission loss of 0.5 dB/km or less at a wavelength of 1380 nm.

2. An optical transmission system according to claim 1, wherein said optical fiber transmission line has an effective core area of at least 45 $\mu m^2$ at a wavelength of 1550 nm.

3. An optical transmission system according to claim 1, wherein said optical fiber transmission line has a chromatic dispersion slope with an absolute value of 0.065 ps/nm²/km or less at a wavelength of 1550 nm.

4. An optical transmission system comprising:

an optical fiber transmission line having a zero-dispersion wavelength of 1350 nm to 1440 rim and a cable cutoff wavelength band of less than 1368 nm, said optical fiber transmission line transmitting signal light at least in a wavelength band from 1450 nm to 1530 nm (S band) and Raman-amplifying said signal light in S band when Raman amplification Dumping light is supplied thereto, said optical fiber transmission line also transmits signal light in a wavelength band from 1530 nm to 1565 nm (C band) or signal light in a wavelength band from 1565 rim to 1625 nm (L band);

Raman amplification pumping light supplying means for supplying said Raman amplification pumping light to said optical fiber transmission line; and an Er-doped optical fiber amplifier for optically amplifying said signal light in C band or L band when Pumping light is supplied thereto, wherein said Raman amplification pumping light supplying means propagates said Raman amplification pumping light from an introducing position for said Raman amplification pumping light into said optical fiber transmission line in a direction opposite from that directed to the Er-doped optical fiber amplifier whose distance from said introducing position along said optical fiber transmission line is the shortest.

5. An optical transmission system according to claim 4, wherein said Raman amplification pumping lights are supplied to both ends of said optical fiber transmission line without passing through said Er-doped optical fiber amplifier.

6. An optical transmission system according to claim 4, wherein said pumping light supplied to said Er-doped optical fiber amplifier has a wavelength of 980 nm.

7. An optical transmission system according to claim 4, wherein said Raman amplification pumping light supplying means comprises two light sources and pumping lights from said two light sources are supplied to said optical fiber transmission line through optical couplers.

* * * * *